United States Patent
Tranovich et al.

(10) Patent No.: US 6,923,212 B2
(45) Date of Patent: Aug. 2, 2005

(54) FAIL SAFE APPARATUS FOR A DIRECT-DRIVE SERVOVALVE

(75) Inventors: Stephen J. Tranovich, Avon, CT (US); Iuliana G. Truia, Meriden, CT (US)

(73) Assignee: Control Components, Inc., Rancho Santa Margarita, CA (US)

( * ) Notice: Subject to any disclaimer, the term of this patent is extended or adjusted under 35 U.S.C. 154(b) by 0 days.

(21) Appl. No.: 10/741,026

(22) Filed: Dec. 19, 2003

(65) Prior Publication Data

US 2004/0238051 A1 Dec. 2, 2004

Related U.S. Application Data

(60) Provisional application No. 60/437,913, filed on Jan. 3, 2003.

(51) Int. Cl.[7] ............................................. F15B 13/044
(52) U.S. Cl. .............................. 137/625.65; 137/624.27
(58) Field of Search ........................ 137/624.27, 625.65

(56) References Cited

U.S. PATENT DOCUMENTS 4,190,081 A * 2/1980 Coles ..................... 137/625.65

2005/0000580 A1 * 1/2005 Tranovich et al. ..... 137/625.65

* cited by examiner

*Primary Examiner*—Gerald A. Michalsky
(74) *Attorney, Agent, or Firm*—Stetina Brunda Garred & Brucker

(57) ABSTRACT

Provided is a servovalve system having a fail safe apparatus adapted for switching the servovalve system between an operating position and a fail safe position. The servovalve system comprises a housing having a housing bore and a housing chamber, a spool moveably disposed within the housing, and a stepper motor connected to the spool and configured to vary the spool position for manipulating the fluid flowing within a fluid circuit when the servovalve system is placed in the operating position. A rotary-linear converter converts rotational motion of the stepper motor into axial motion of the spool. The fail safe apparatus includes a piston slidably sealed within the housing chamber and mechanically coupled to the rotary-linear converter. The piston is operative to move the spool from the operating position to the fail safe position upon a loss of fluid pressure in the housing chamber.

21 Claims, 2 Drawing Sheets

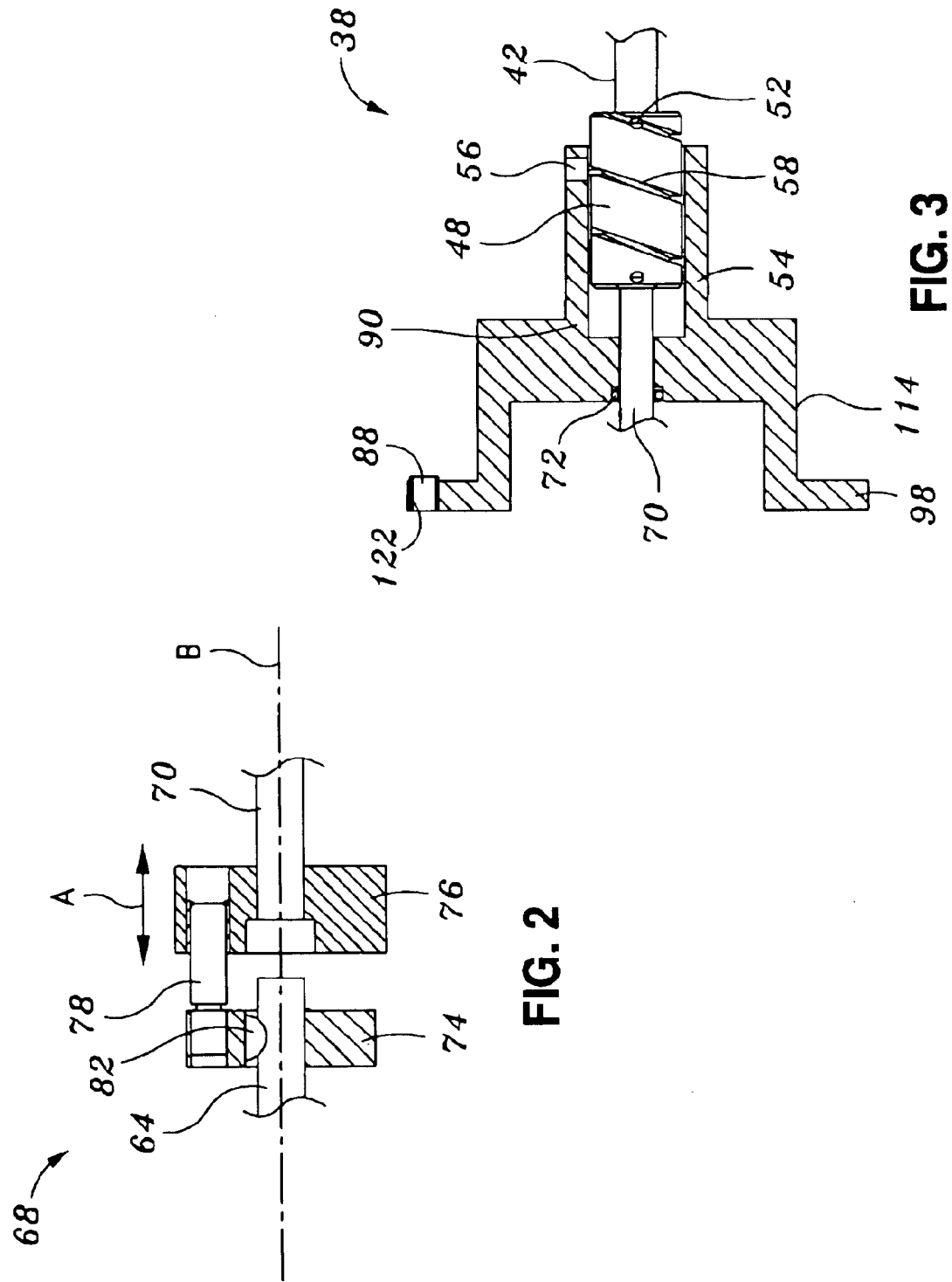

FAIL SAFE APPARATUS FOR A DIRECT-DRIVE SERVOVALVE

CROSS-REFERENCE TO RELATED APPLICATIONS

The present application claims priority to U.S. Provisional Application Ser. No. 60/437,913 entitled FAIL SAFE APPARATUS FOR A DIRECT-DRIVE SERVOVALVE filed Jan. 3, 2003.

STATEMENT RE: FEDERALLY SPONSORED RESEARCH/DEVELOPMENT (Not Applicable)

BACKGROUND OF THE INVENTION

The present invention relates to fluid flow control and, more particularly, to a uniquely configured servovalve system having a fail safe apparatus incorporated therein for switching the servovalve system between an operating position and a fail safe position upon occurrence of a failure of the servovalve system.

Servovalves are often utilized in a fluid system to precisely manipulate or regulate the flow rate and/or pressure of fluid flowing within a fluid circuit. The fluid, which can include both liquids and gases, is typically employed to move an actuator, which is conventionally comprised of a piston sealed within a cylinder. The servovalve manipulates the fluid flowing within the fluid circuit in order to move the piston by forcing fluid into one end of the cylinder while simultaneously withdrawing or exhausting the fluid out of an opposing end of the cylinder. Servovalves are most often used in closed-loop fluid systems wherein the position of the actuator, and velocity and/or pressure of fluid flowing within the fluid circuit is continuously monitored with a feedback device which generates system feedback signals.

A controller uses the system feedback signals to generate command signals that are received by the servovalve. The servovalve responds to the command signals to regulate the fluid flowing within the fluid circuit in such a manner so as to minimize the error between a desired position of the piston and an actual position of the piston within the cylinder. Servovalves generally incorporate a spool which either rotates or slides axially in a housing to port the fluid flow to a desired location. Utilizing hydraulic amplification of the command signal, some servovalves utilize fluid pressure acting on a small pilot stage to provide motive force to position the spool.

However, direct drive servovalves position or drive the spool directly using an electrically powered stepper motor that is mechanically connected to the spool. Stepper motors are comprised of multiple magnetic detents that incrementally oppose rotation of the stepper motor when power is applied. However, even when power is not applied to the stepper motor, the magnetic detents continue to oppose rotation of the stepper motor. Unfortunately, this characteristic of stepper motors presents a danger to property and personnel in that the spool will remain in its last position upon loss of power to the stepper motor. Therefore, the fluidic device under control, such the above-mentioned actuator, will be in an unknown position when power is restored to the stepper motor.

For this reason, it is highly desirable to provide a fail safe mode in the event of a failure. Failure of the fluid system may include a loss of fluid pressure within the fluid circuit and/or a loss of electrical power to the servovalve and/or failure of the controller. In the fail safe mode, the piston is preferably moved to one of its stroke extremes by allowing pressurized fluid to enter one end of the cylinder while simultaneously allowing fluid to escape an opposing end of the cylinder. Because the failure of the fluid system may include a loss of electrical power, it is necessary that the servovalve system may be placeable in the fail safe position even when the servovalve system is rendered inoperable.

In prior art fluid systems, a fail safe apparatus may be provided by incorporating redundant servovalves or a network of solenoid valves into the fluid circuit. Unfortunately, such additional components add to the complexity, cost and maintenance of the fluid system. In addition, such additional components add to the overall volumetric requirements for the fluid system. Volumetric requirements are particularly important for very large servovalves typically used with high flow rate fluid systems due to the relatively large-sized components that are required. Because most fluid systems require a fail safe system having similarly high flow rates, the addition of the fail safe system essentially doubles the volumetric requirements.

As can be seen, there exists a need in the art for a direct drive servovalve system having a fail safe apparatus for switching the servovalve system to a fail safe position upon occurrence of a variety of failure conditions including, but not limited to, loss of electrical power and failure of the controller. Furthermore, there exists a need in the art for a direct drive servovalve system having a fail safe apparatus that is of simple construction, of low cost, and which is easily maintained. In addition, there exists a need in the art for a direct drive servovalve system having a fail safe apparatus that is relatively compact in order to limit the overall volumetric requirements for the fluid system.

BRIEF SUMMARY OF THE INVENTION

The present invention specifically addresses and alleviates the above reference deficiencies associated with direct drive servovalve systems. More particularly, the present invention is a servovalve system having a fail safe apparatus incorporated therein for switching the servovalve system between an operating position and a fail safe position upon occurrence of a fluid system failure or a servovalve system malfunction. In the operating position, fluid flowing in a fluid circuit may be regulated by the servovalve system in order to control a fluidic device such as an actuator. In the fail safe position, the flow of fluid through the servovalve system is such that movement of the fluidic device may be neutralized.

The servovalve system of the present invention comprises a housing having a housing bore and a housing chamber, a spool axially moveably disposed within the housing bore, a stepper motor operatively connected to the spool, a rotary-linear converter interposed between the stepper motor and the spool, and a fail safe apparatus comprised of a piston axially moveable within the housing chamber. The piston is configured to move the spool from the operating position to the fail safe position upon a loss of fluid pressure in the housing chamber. The spool may be moved from the fail safe position back to the operating position by introducing pressurized fluid into the housing chamber.

The stepper motor is adapted to be incrementally rotatable about an axis of rotation and is indirectly connected to the spool through a coupling mechanism and through the rotary-linear converter. The rotary-linear converter converts rotational motion of the stepper motor into linear or axial motion of the spool. The coupling mechanism allows the rotary-linear converter and the spool to axially move as a distance between the stepper motor and the rotary-linear converter varies as may occur during switching between the operating and fail safe positions. When the servovalve system is in the operating position, rotation of the stepper motor causes the spool position to incrementally vary along a spool stroke length. The rotary-linear converter may be configured as a ball screw cooperatively or threadably engaged to a ball nut. A pair of ball screw stops may be disposed on opposing ends of the ball screw to limit travel of the ball nut such that axial movement of the spool is likewise restricted.

The piston is axially slidably sealed within the housing chamber which has a first end and a second end. A control port fluidly connects the first end of the housing chamber to a fluid pressure source such that pressurized fluid may be introduced into the first end of the housing chamber. In this manner, the piston may be translated from the fail safe position to the operating position wherein the piston is placed into abutting contact with a piston stop. The housing has a piston seal, a stepper motor shaft seal and a coupling shaft seal to prevent leakage of pressurized fluid in the first end of the housing chamber. The piston may be biased to the fail safe position by a piston spring.

BRIEF DESCRIPTION OF THE DRAWINGS

These as well as other features of the present invention will become more apparent upon reference to the drawings wherein:

FIG. 2 is a cross-sectional view of a coupling mechanism as may be included in the servovalve system for connecting a stepper motor to a rotary-linear converter of the servovalve system; and FIG. 3 is a partial cross-sectional view of an alternate embodiment of the rotary-linear converter.

DETAILED DESCRIPTION OF THE INVENTION

Figure 1:
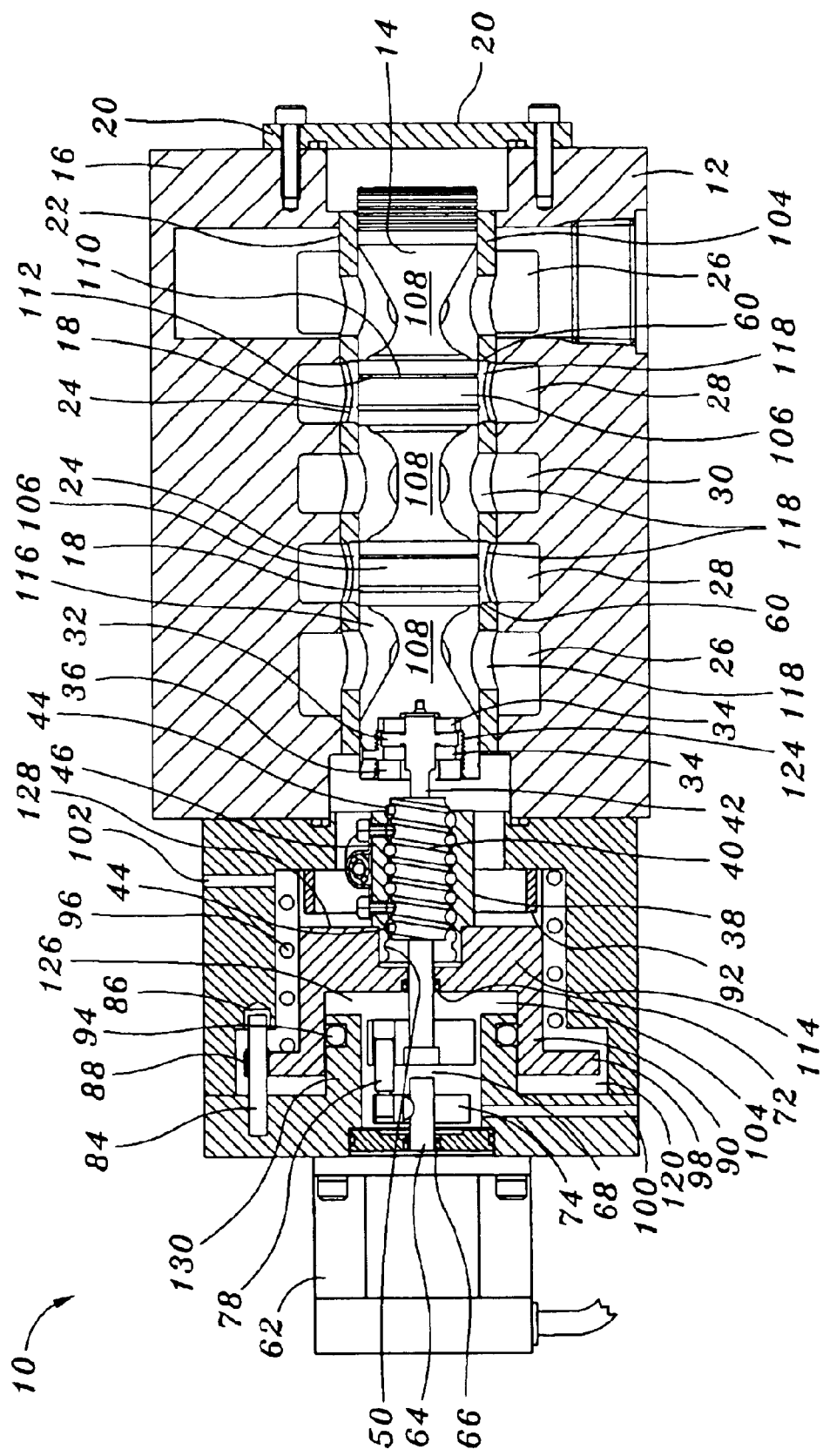
FIG. 1 is a partial cross-sectional view of a servovalve system and illustrating a fail safe apparatus incorporated therein and configured for switching the servovalve system between an operating position and a fail safe position.

Referring now to the drawings wherein the showings are for purposes of illustrating the present invention and not for purposes of limiting the same, shown in FIG. 1 is a servovalve system 10 having a fail safe apparatus 114 incorporated therein. The fail safe apparatus 114 is specifically adapted for switching the servovalve system 10 between a normal operating position and a null or fail safe position. In the operating position, fluid flowing in a fluid circuit (not shown) may be regulated by the servovalve system 10 in order to control a fluidic device (not shown).

In the fail safe position, the flow of fluid through the servovalve system 10 is such that movement of the fluidic device may be neutralized. The fluidic device under control may be configured as an actuator having a piston slidably sealed within a cylinder. The fail safe apparatus 114 may be configured to cause the actuator to be neutralized such that the piston is moved to one of opposing ends of its stroke. It should be noted that the fail safe apparatus 114 may also be configured to cause the fluidic device under control to move to any preselected position in order to meet the particular operating requirements of the fluid system.

FIG. 1 illustrates the servovalve system 10 of the present invention comprising a housing 16 having a housing bore 104 and a housing chamber 120, an elongate spool 14 linearly or axially moveably disposed within the housing bore 104, a stepper motor 62 operatively connected to the spool 14, a rotary-linear converter 38 interposed between the stepper motor 62 and the spool 14, and a fail safe apparatus 114 comprised of a piston 90 axially moveably disposed within the housing chamber 120. The servovalve system 10 may further include a hollow tubular sleeve 22 concentrically nested within the housing bore 104. The spool 14 may be slidably disposed in the sleeve 22 in a manner that will be described in greater detail below. The combination of the spool 14 and the housing 16 collectively comprise a servovalve assembly 12 of the servovalve system 10.

As shown in FIGS. 1 and 2, the piston 90 is mechanically coupled to the rotary-linear converter 38 and is operative to move the spool 14 from the operating position to the fail safe position upon a loss of fluid pressure in the housing chamber 120. Upon moving the spool 14 to the fail safe position, the fluidic device under control is caused to be moved to a corresponding neutralized position. When desired, the spool 14 may be moved from the fail safe position back to the operating position by introducing pressurized fluid into the housing chamber 120. The fluidic device under control may then be regulated in the normal manner.

As is shown in FIG. 1, the stepper motor 62 may be mounted on an exterior of the housing 16 and may be configured as a rotary reversible stepper motor 62 adapted to be incrementally rotatable over a desired angle of rotation. However, various other motors that are capable of providing precise rotational motive force, including direct current servomotors, may be utilized for controlling the relative motion of the spool 14. The stepper motor 62 may have a stepper motor shaft 64 extending into the housing 16. The stepper motor shaft 64 rotates about an axis of rotation indicated by the arrow B in FIG. 1. The stepper motor shaft 64 may be indirectly connected to the spool 14 through a coupling mechanism 68 and through the rotary-linear converter 38.

The rotary-linear converter 38 is configured to convert rotational motion of the stepper motor 62 into linear or axial motion of the spool 14. When the servovalve system 10 is in the operating position, incremental rotation of the stepper motor 62 and, hence, the stepper motor shaft 64, causes the spool 14 position to be incrementally varied along a spool 14 stroke length. The coupling mechanism 68 may be interposed between the stepper motor 62 and the rotary-linear converter 38. The coupling mechanism 68 is configured to allow the rotary-linear converter 38 and the spool 14 to axially move as a distance between the stepper motor 62 and the rotary-linear converter 38 varies. Such varying distance between the stepper motor 62 and the rotary-linear converter 38 occurs during translation of the spool 14 between the operating position and the fail safe position.

Referring now to FIG. 2, the coupling mechanism 68 is comprised of a rotatable first coupling member 74 disposed in axially spaced relation to and coaxially aligned with a second coupling member 76. In the embodiment shown in FIG. 1, the first and second coupling members 74, 76 rotate about the axis of rotation B. The first coupling member 74 is fixedly mounted on the stepper motor shaft 64. A key 82 or alternate locking feature may be included between the first coupling member 74 and the stepper motor shaft 64 in order to prevent relative rotational motion and relative axial motion therebetween. The first coupling member 74 may be generally disc shaped although it is contemplated that the first coupling member 74 may be configured in a variety of alternative shapes.

Referring still to FIG. 2, the second coupling member 76 may also be generally disc shaped and may be mounted on a coupling shaft 70 extending axially outwardly from the second coupling member 76. The second coupling member 76 is preferably non-rotatably and axially fixedly mounted on the coupling shaft 70. The coupling shaft 70 passes through the piston 90. A locking feature may be provided between the second coupling member 76 and the coupling shaft 70 to prevent relative rotation therebetween in a manner similar to that described above for the first coupling member 74. Offset from the center of rotation B of the coaxially aligned first and second coupling members 74, 76 is an offset pin 78.

As can be seen in FIG. 2, the offset pin 78 extends axially outwardly from the first coupling member 74 toward the second coupling member 76 and is disposed in general alignment with the axis of rotation B. The offset pin 78 may be axially fixed to a periphery of the first coupling member 74 and axially slidable within an offset pin bore 80 formed in a periphery of the second coupling member 76. The offset pin bore 80 may be sized and configured to be complementary to the offset pin 78 such that a sliding fit is provided therebetween.

The offset pin 78 is preferably configured to allow stepper motor 62 torque to be transferred from the first coupling member 74 to the second coupling member 76 as the first and second coupling members 74, 76 axially translate relative to one another along a translation direction indicated by the arrow A in FIG. 2. Preferably, the offset pin 78 and offset pin bore 80 are sized and configured to restrict axial loading of the coupling mechanism 68. Toward this end, a bushing may be included in the offset pin bore 80 in order to prevent backlash during between the first and second coupling members 74, 76 during changes in rotational direction of the stepper motor 62. The offset pin 78 and offset pin bore 80 may also be configured to provide a relatively low level of axial sliding friction between the offset pin 78 and the bushing. In this manner, axial translation of the offset pin 78 within the offset pin bore 80 may be facilitated when the coupling shaft 70 is caused to be translated along the translation direction A.

Referring now to FIG. 1, the rotary-linear converter 38 is illustrated as a ball screw 40 cooperatively or threadably engaged to a ball nut 42 via ball nut grooves 50. The ball screw 40 is connected to the coupling mechanism 68 on one end by a stepper motor shaft 64. The ball screw 40 is cooperatively engaged to a ball nut 42 on an end of the shaft opposite that which is secured to the coupling mechanism 68. The ball nut 42 is connected to the spool 14 on an end thereof. Included with the ball screw 40 may be a pair of ball screw stops 44 disposed on opposing ends of the ball screw 40. The ball screw stops 44 are configured to limit travel of the ball nut 42 such that axial movement of the spool 14 is likewise restricted. In this regard, the ball screw stops 44 define opposing ends of the spool 14 stroke length.

Other configurations of the rotary-linear converter 38 may be adapted for use with the servovalve system 10 of the present invention. For example, as shown in FIG. 3, a linear cam 48 may be cooperatively engaged to a piston sleeve 22 of the piston 90 in order to convert rotational motion of the stepper motor 62 into axial motion of the spool 14. The linear cam 48 may be generally cylindrically shaped although it is contemplated that the linear cam 48 may be configured in a variety of alternative shapes. The linear cam 48 may include at least one cam slot or cam groove 58 helically or spirally formed in the linear cam 48. A pair of cam pins 52 may be disposed on opposing ends of the linear cam 48 to restrict axial motion of the spool 14 and define extreme ends of the spool 14 stroke length. The piston sleeve 22 may extend axially outwardly from the piston 90 and may be disposed about and cooperatively engaged to the linear cam 48.

The piston sleeve 22 may be configured in an open tube-like configuration although other configurations are contemplated. For example, the piston sleeve 22 may be configured as a plurality of radially spaced fingers projecting axially outwardly from the piston 90. Regardless of its specific configuration, the piston sleeve 22 may include at least one sleeve pin 56 sized and configured to be complementary to and cooperatively engaged to the cam groove 58 in order to provide a sliding fit therebetween.

Referring still to FIG. 1, extending axially outwardly from the linear cam 48 is the converter shaft 42. The converter shaft 42 connects the rotary-linear converter 38 to the spool 14. The spool 14 may be either rotatably or non-rotatably connected to the rotary-linear converter 38. For servovalve systems 10 utilizing relatively small spools 14 that are generally symmetrically formed about the axis of translation, rotation of the spool 14 may be allowable without introducing significant performance penalties on the stepper motor 62. However, for servovalve systems 10 adapted for providing high fluid flow rates, relatively large spools must be employed. Unfortunately, such large spools have relatively large moments of inertia necessitating the employment of a stepper motor having relatively high torque output.

In order to reduce stepper motor 62 torque requirements, it is preferable that the servovalve system 10 is configured such that relatively large spools are non-rotatable. Toward this end, the converter shaft 42 of the present invention is preferably configured such that the ball screw 40 may rotate without accompanying rotation of the spool 14. Such a condition may be achieved according to the arrangement shown in FIG. 1 wherein a radially extending converter shaft flange 32 may be non-rotatably fixed on an end of the converter shaft 42 adjacent an end of the spool 14.

The converter shaft flange 32 may be integrally formed with the converter shaft 42 or it may be mechanically secured thereto. The converter shaft flange 32 is captured between a pair of thrust bearings 34 that are rotatably secured to a spool bore 124 formed in the end of the spool 14 adjacent the rotary-linear converter 38. The thrust bearings 34 and converter shaft flange 32 may be retained by a bearing nut 36 that is threadably engaged to the spool bore 124. The combination of the converter shaft flange 32 and the thrust bearings 34 allows for transmission of axial thrust to the spool 14 with minimal or negligible transmission of torque.

Referring to FIG. 1, the fail safe apparatus 114 may be configured as a combination of the piston 90 axially slidably sealed within the housing chamber 120 and operating in conjunction with the coupling mechanism 68. The housing chamber 120 has a first end 126 and a second end 128. A piston stop 92 axially extends from the housing 16 adjacent the second end 128 of the housing chamber 120. The piston stop 92 may be configured as a relatively short tubular member. However, there are an infinite variety of configurations in which the piston stop 92 may be configured.

The housing 16 includes a control port 100 fluidly connecting the first end 126 of the housing chamber 120 to a fluid pressure source (not shown). The control port 100 is configured to allow for the introduction of pressurized fluid into the first end 126 of the housing chamber 120 such that the piston 90 may be translated from the fail safe position, as shown in FIG. 1, to the operating position wherein the piston 90 is placed into abutting contact with the piston stop 92. The housing 16 further includes an exhaust port 102 for venting the second end 128 of the housing chamber 120 during translation of the piston 90.

As shown in FIG. 1, the piston 90 has a generally cylindrical shape with the piston sleeve 22 axially extending from one end of the piston 90 and a piston flange 98 radially extending from an opposite end of the piston 90. The first end 126 of the housing chamber 120 may include an axially extending circular housing flange 130. The piston 90 is concentrically and axially slidably mounted on the circular housing flange 130. In order to seal the piston 90 against leakage, a piston seal 94 is preferably circumferentially disposed within a receiving groove extending about an exterior surface of the circular housing flange 130.

The piston 90, piston seal 94 and circular housing flange 130 are preferably sized and configured to provide a relatively fluid tight sliding fit. It is contemplated that the piston seal 94 may be fabricated of elastomeric material and may be configured with a generally circular cross-sectional shape. The housing 16 may include a stepper motor shaft seal 66 disposed about the stepper motor shaft 64 at a location where the stepper motor shaft 64 extends into the housing chamber 120. In addition, the piston 90 may include a coupling shaft seal 72 disposed about the coupling shaft 70 at a location where the coupling shaft 70 extends through the piston 90. The stepper motor shaft seal 66 and coupling shaft seal 72 are configured to prevent leakage of pressurized fluid in the first end 126 of the housing chamber 120.

Axial movement of the piston 90 is in general alignment with the translation axis A. As was earlier mentioned, the piston 90 is mechanically coupled to the rotary-linear converter 38. More specifically, in the configuration shown in FIGS. 1 and 3, the ball nut 42 is non-rotatably secured to the piston 90 by suitable fastening means. Pressurized fluid may be introduced into the first end 126 of the housing chamber 120 in order to effectuate piston 90 movement from the fail safe position to the operating position in a manner that will be described in greater detail below.

Referring still to FIG. 1, the piston 90 may be configured to be biased to the fail safe position by a piston spring 96 operatively engaged thereto. The piston spring 96 may be configured as a simple compression spring concentrically disposed about an exterior cylindrical surface of the piston 90 and captured between the piston flange 98 and the second end 128 of the housing chamber 120. When pressurized fluid is introduced into the first end 126, the piston 90 is forced into contact with the piston stop 92 such that the servovalve system 10 and, hence, the spool 14, is moved into the operating position.

When pressure is removed from the first end 126 of the housing chamber 120, the piston spring 96 forces the piston 90 to move to the fail safe position. Translation of the piston 90 from the operating to fail safe position causes corresponding translation of the ball nut 42. Because the ball nut 42 is affixed to the spool 14, the spool 14 is, in turn, translated to the fail safe position. However, because the axial location of the spool 14 may vary relative to the ball screw 40 during normal operation of the servovalve system 10, it is necessary that the piston 90 stroke length is sized to be about twice the spool 14 stroke length in order to ensure effective activation of the fail safe apparatus 114. In this manner, the spool 14 may be moved to the fail safe position regardless of the rotational position of the stepper motor 62 or, more specifically, the position of the spool 14 immediately prior to activation of the fail safe apparatus 114.

Rotation of the piston 90 may be prevented by providing at least one anti-rotation pin 84 that may be journaled into and which axially extends from the housing 16. At least one anti-rotation pin bore 122 may be formed through the piston flange 98. The anti-rotation pin bore 122 may be configured to axially slidably receive the anti-rotation pin 84. The anti-rotation pin 84 may extend into a cavity 86 formed in the housing 16 opposite an end of the anti-rotation pin 84 that is journaled into the housing 16. The cavity 86 may aid in assembly and disassembly of the servovalve system 10 such as may be required during installation and maintenance, etc. A pin bushing 88 may be included in the anti-rotation pin bore 122 to prevent backlash during changes in rotational direction of the stepper motor 62 as well as to transmit torque from the piston 90 into the housing 16 with minimal transmission of axial sliding forces.

As may be seen, there are an infinite number of arrangements for the fail safe apparatus 114 (i.e., the piston 90 disposed within the housing chamber 120 operating in conjunction with the coupling mechanism 68) that may be employed to provide the fail safe functionality without departing from the teachings of the present invention. For example, a simple cylinder having a double rod may be substituted for the piston 90 arrangement of the present invention. Importantly, the coupling mechanism 68 provides a necessary feature to the fail safe apparatus 114 by allowing the effective length of the stepper motor shaft 64 to be variable such that the piston 90 may be translated between the operating and fail safe positions.

In the configuration shown in FIG. 1, the spool 14 is axially slidably moveable within the housing 16 such that the stepper motor 62 may linearly translate the spool 14 to a variety of positions. As can be seen, the housing 16 is provided with numerous axially spaced housing 16 passages formed therein and through which fluid may be selectively routed for circulation through the housing bore 104 or sleeve 22 and into the fluid circuit. Return or exhaust passages 26 are included in the housing 16 along with pressure passages 30 and cylinder passages 28. The exhaust, cylinder and pressure passages 26, 28, 30 are interconnected to ports (not shown), which communicate the fluid through the fluid circuit to the actuator or other fluidic device under control. A removable end plate 20 may be secured to an end of the housing 16 with mechanical fasteners or other suitable means in order to seal the housing 16.

The spool 14 of the servovalve system 10 may include a plurality of substantially cylindrically shaped spool lobes 106 alternately spaced between a plurality of reduced portions 108. The spool lobes 106 may preferably be sized and configured to be complementary to the housing bore 104. Furthermore, the spool lobes 106 may preferably be generally aligned with certain ones of the housing 16 passages such that fluid communication to the fluid circuit is generally blocked when the spool 14 is moved to the fail safe position. More specifically, when the spool 14 is moved to the fail safe position by the fail safe apparatus 114 due to corresponding movement of the piston 90, it is typically desirable that the flow of fluid through the servovalve system 10 is such that movement of the fluidic device is neutralized. For the case wherein the fluidic device is the actuator, it is typically desirable that the piston 90 is moved to one of its stroke extremes.

In the servovalve system 10 shown in FIG. 1, the cylinder passages 28 are preferably generally aligned with the spool lobes 106 when the spool 14 is placed in the fail safe position. In this position, there may be a small amount of fluid leakage between spool lobes 106 and the housing bore 104 or sleeve 22 due to minor clearances therebetween that allow for sliding movement of the spool 14. However, in some applications, it may be necessary to substantially eliminate such leakage. For example, in the case of a pneumatic fluid system where the fluid is a gas such as air stored in an air tank, the air tank may provide fluid pressure to move the pneumatic actuator to the fail safe position in the event of an air supply failure.

In order to reduce the susceptibility for fluid leakage between the spool 14 and the housing bore 104 or sleeve 22, a substantially leak proof seal may be required when the spool 14 is moved to the fail safe position. Toward this end, the spool lobes 106 may include at least one circumferentially disposed spool bushing 18. The spool bushing 18 may be configured as an O-ring seal 112. The spool lobes 106 may have at least one circumferential lobe groove 110 formed therewithin and in which the O-ring seal 112 may be mounted. The O-ring seal 112 may be fabricated of elastomeric material including, but not limited to, fluoroelastomeric rubber. In order to accommodate the spool bushings 18, the housing 16 may include a plurality of annular seats 24 formed within the housing bore 104 or sleeve 22 in general registration with the housing 16 passages.

In the configuration shown in FIG. 1, the annular seats 24 may be formed in registration with the cylinder passages 28. Each one of the annular seats 24 may have opposing side walls 60. The side walls 60 extend around circumferential edges of each one of the annular seat 24. Preferably the spool bushings 18 are axially located such that direct engagement thereof against at least one of the side walls 60 creates a generally fluid tight seal for blocking fluid flow when the spool 14 is moved to the fail safe position. However, it is also preferable such that the spool bushings 18 are axially located between the side walls 60 of the annular seats 24 such that the spool bushings 18 may not affect normal operation of the servovalve system 10 when the spool 14 is moved to the operating position.

As will be appreciated, it may be desirable to provide the side walls 60 with a complementary mating surface for the spool bushings 18. In this regard, the side walls 60 may be provided in a contoured or shaped condition free of sharp edges or other surface features that may damage the spool bushings 18 or may otherwise prevent formation of a substantially fluid-tight seal. The combination of the spool bushings 18 and the contoured condition of the side walls 60 may also reduce the criticality of maintaining relatively tight machining tolerances and/or maintaining alignment of the spool 14 with the housing 16 passages.

In accordance with the configuration of the servovalve system 10 shown in FIG. 1, the housing 16 may include the sleeve 22 disposed within the housing bore 104. The sleeve 22 may have an interior sleeve surface 116 sized and configured to be complementary to the spool lobes 106 such that a sliding fit is provided therebetween. The sleeve 22 may include a plurality of sleeve passages 118 fluidly interconnecting the interior sleeve surface 116 to the housing 16 passages and having a plurality of the annular seats 24 formed within the sleeve 22 surface in general registration with the sleeve passages 118. As was earlier mentioned, each one of the annular seats 24 in the sleeve 22 has opposing side walls 60 that may preferably be contoured in a manner similar to that which was described above for the housing bore 104.

The operation of the servovalve system 10 will now be described with reference to FIG. 1. Initially, the servovalve system 10 may be placed in the operating position by passing pressurized fluid through the control port 100 and into the second end 128 of the housing chamber 120. The force of the pressurized fluid acting on the piston 90 overcomes a biasing force of the piston spring 96 which normally biases the piston 90 to the fail safe position. In this manner, the piston 90 is axially translated until contacting the piston stop 92. The exhaust port 102 allows fluid to be vented out of the second end 128 simultaneous with the introduction of pressurized fluid into the first end 126.

The coupling mechanism 68 allows the rotary-linear converter 38 and the spool 14 to axially move as the distance between the stepper motor 62 and the rotary-linear converter 38 increases. Due to the arrangement of the coupling mechanism 68, rotational motion of the stepper motor 62 may still be transmitted to the rotary-linear converter 38 regardless of changes in distance between the stepper motor 62 and the rotary-linear converter 38 as occurs during movement of the spool 14 between the operating position and the fail safe position. The stepper motor shaft seal 66, coupling shaft seal 72 and piston seal 94 prevent fluid leakage and corresponding loss of pressure in the first end 126 of the housing chamber 120 while the piston 90 is maintained in abutting contact with the piston stop 92.

In the operating position, rotational motion of the stepper motor 62 is converted to axial motion of the spool 14 by the rotary-linear converter 38. In this manner, the stepper motor 62 may selectively axially position the spool 14 relative to the sleeve 22 such that fluid may be selectively ported through the pressure, cylinder and exhaust passages 26, 28, 30. The piston 90 may have a tendency to rotate during normal operation of the servovalve system 10 due to transmission of torque by the rotary-linear converter 38. Such rotational motion of the piston 90 may be prevented by the incorporation of the anti-rotation pin 84 that is axially slidably received by the anti-rotation pin bore 122 formed in the piston flange 98.

When fluid pressure is removed from the first end 126, the piston spring 96 forces the piston 90 to the fail safe position resulting in axial movement of the rotary-linear converter 38 which, in turn, causes the spool 14 to axially move to the fail safe position. As was earlier mentioned, in order to ensure effective activation of the fail safe apparatus 114, it is necessary that the piston 90 stroke length is about twice the spool 14 stroke length. In this manner, the spool 14 may be moved to the fail safe position regardless of the position of the spool 14 immediately prior to activation of the fail safe apparatus 114. If included, the spool bushings 18 may be placed in direct engagement with the side walls of the annular seats 24 in order to provide a substantially leak-proof seal between the spool 14 and the interior sleeve surface 116 when the servovalve system is in the fail safe position.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A servovalve system for regulating fluid flowing within a fluid circuit, the servovalve system including a fail safe apparatus adapted for switching the servovalve system between an operating position and a fail safe position, the servovalve system comprising:

a housing having a housing bore and a housing chamber;

an elongate spool axially moveably disposed within the housing bore;
a stepper motor operatively connected to the spool and configured to be rotatable over a desired angle of rotation in order to selectively vary a spool position relative to the housing bore for manipulating the fluid flowing within the fluid circuit when the servovalve system is in the operating position;
a rotary-linear converter interposed between the stepper motor and the spool and configured to convert rotational motion of the stepper motor into axial motion of the spool; and
a piston axially moveably sealed within the housing chamber, the piston being mechanically coupled to the rotary-linear converter and being operative to move the spool from the operating position to the fail safe position upon a loss of fluid pressure in the housing chamber.

2. The servovalve system of claim 1 wherein:
the spool is configured to be axially translatable along a spool stroke length;
the piston is configured to be axially translatable along a piston stroke length that is about twice that of the spool stroke length such that the spool may be moved to the fail safe position regardless of a rotational position of the stepper motor.

3. The servovalve system of claim 1 wherein:
the servovalve system includes an anti-rotation pin journaled into the housing;
the piston includes a radially outwardly extending piston flange having an anti-rotation pin bore formed therethrough, the anti-rotation pin bore being configured to axially slidably receive the anti-rotation pin for preventing rotational motion of the piston.

4. The servovalve system of claim 1 wherein the housing includes a piston stop against which the piston bears when the spool is moved to the operating position.

5. The servovalve system of claim 4 wherein the housing includes a control port to allow pressurization of a first end of the housing chamber for moving the piston against the piston stop, the housing further including an exhaust port for venting a second end of the housing chamber during piston movement.

6. The servovalve system of claim 1 wherein:
the housing includes a plurality of axially spaced housing passages fluidly connecting the housing bore to the fluid circuit;
the spool includes a plurality of substantially cylindrically shaped spool lobes alternately spaced between a plurality of reduced portions, the spool lobes being sized and configured to be complementary to the housing bore and being generally aligned with certain ones of the housing passages such that fluid communication to the fluid circuit is generally blocked when the spool is moved to the fail safe position.

7. The servovalve system of claim 6 wherein:
the housing includes a plurality of annular seats formed within the housing bore in registration with the housing passages, each one of the annular seats having opposing side walls;
each one of the spool lobes including at least one circumferentially disposed spool bushing axially located such that direct engagement thereof against at least one of the side walls creates a generally fluid tight seal for blocking fluid flow when the spool is moved to the fail safe position.

8. The servovalve system of claim 7 wherein the side walls are contoured to provide a complementary mating surface for the spool bushing.

9. The servovalve system of claim 6 further comprising:
a hollow tubular sleeve disposed within the housing bore and having an interior sleeve surface sized and configured to be complementary to the spool lobes, the sleeve including a plurality of sleeve passages fluidly interconnecting the interior sleeve surface to the housing passages and having a plurality of annular seats formed within the sleeve surface in registration with the sleeve passages, each one of the annular seats having opposing side walls;
wherein each one of the spool lobes including at least one circumferentially disposed spool bushing axially located along the spool lobe such that direct engagement of spool bushing against at least one of the side walls creates a generally fluid tight seal for blocking fluid flow when the spool is moved to the fail safe position.

10. The servovalve system of claim 6 wherein:
each one of the spool lobes includes at least one circumferential lobe groove;
each one of the spool bushings is configured as an O-ring seal mounted in the lobe groove.

11. The servovalve system of claim 10 wherein the O-ring seal is formed of elastomeric material.

12. The servovalve system of claim 1 wherein the rotary-linear converter is configured as a ball screw cooperatively engaged to a ball nut, the ball screw being coupled to the spool, the ball nut being coupled to the piston.

13. The servovalve system of claim 1 wherein the rotary-linear converter is configured as linear cam cooperatively engaged to a piston sleeve of the piston, the linear cam being coupled to the spool.

14. A servovalve system for regulating fluid flowing within a fluid circuit, the servovalve system including a fail safe apparatus adapted for switching the servovalve system between an operating position and a fail safe position, the servovalve system comprising:
a housing having an elongate housing bore and a housing chamber;
an elongate spool slidably disposed within the housing bore and configured to be axially translatable along a spool stroke length;
a rotary reversible stepper motor operatively connected to the spool and configured to be incrementally rotatable over a desired angle of rotation in order to selectively vary the spool position relative to the housing bore for manipulating the fluid flowing within the fluid circuit when the servovalve is in the operating position;
a rotary-linear converter interposed between the stepper motor and the spool and configured to convert rotational motion of the stepper motor into axial motion of the spool; and
a piston slidably sealed within the housing chamber and mechanically coupled to the rotary-linear converter and being operative to move the spool from the operating position to the fail safe position upon a loss of fluid pressure in the housing chamber, the piston being biased to the fail safe position by a spring operatively engaged thereto and being configured to be axially translatable along a piston stroke length that is about twice that of the spool stroke length such that the spool may be moved to the fail safe position regardless of a rotational position of the stepper motor.

15. The servovalve system of claim 14 wherein:

the servovalve system includes an anti-rotation pin journaled into the housing;

the piston includes a radially outwardly extending piston flange having an anti-rotation pin bore formed therethrough, the anti-rotation pin bore being configured to axially slidably receive the anti-rotation pin for preventing rotational motion of the piston.

16. The servovalve system of claim 14 wherein the piston is biased to the fail safe position by a spring operatively engaged thereto.

17. The servovalve system of claim 14 wherein the housing includes a piston stop against which the piston bears when the spool is moved to the operating position.

18. The servovalve system of claim 17 wherein the housing includes a control port to allow pressurization of a first end of the housing chamber for moving the piston against the piston stop, the housing further including an exhaust port for venting a second end of the housing chamber during piston movement.

19. The servovalve system of claim 14 wherein:

the housing includes a plurality of axially spaced housing passages fluidly connecting the housing bore to the fluid circuit;

the spool includes a plurality of substantially cylindrically shaped spool lobes alternately spaced between a plurality of reduced portions, the spool lobes being sized and configured to be complementary to the housing bore and being generally aligned with certain ones of the housing passages such that fluid communication to the fluid circuit is generally blocked when the spool is moved to the fail safe position.

20. The servovalve system of claim 19 wherein:

the housing includes a plurality of annular seats formed within the housing bore in registration with the housing passages, each one of the annular seats having opposing side walls;

each one of the spool lobes including at least one circumferentially disposed spool bushing axially located such that direct engagement thereof against at least one of the side walls creates a generally fluid tight seal for blocking fluid flow when the spool is moved to the fail safe position.

21. The servovalve system of claim 19 further comprising:

a hollow tubular sleeve disposed within the housing bore and having an interior sleeve surface sized and configured to be complementary to the spool lobes, the sleeve including a plurality of sleeve passages fluidly interconnecting the interior sleeve surface to the housing passages and having a plurality of annular seats formed within the sleeve surface in registration with the sleeve passages, each one of the annular seats having opposing side walls;

wherein each one of the spool lobes including at least one circumferentially disposed spool bushing axially positioned along the spool lobe such that direct engagement of the spool bushing against at least one of the side walls creates a generally fluid tight seal for blocking fluid flow when the spool is moved to the fail safe position.

* * * * *